US012387385B2

(12) United States Patent
Franklin et al.

(10) Patent No.: US 12,387,385 B2
(45) Date of Patent: *Aug. 12, 2025

(54) METHODS AND SYSTEMS FOR AUGMENTING VISUAL CONTENT (71) Applicant: Adeia Guides Inc., San Jose, CA (US)

(72) Inventors: Christopher Franklin, Drexel Hill, PA (US); Jennifer L. Holloway, Wallingford, PA (US); Daniel P. Rowan, Springfield, PA (US); Nathalia S. Santos-Sheehan, Royersford, PA (US)

(73) Assignee: ADEIA GUIDES INC., San Jose, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/481,637

(22) Filed: Sep. 22, 2021

(65) Prior Publication Data

US 2022/0005237 A1 Jan. 6, 2022

Related U.S. Application Data (63) Continuation of application No. 17/253,454, filed as application No. PCT/US2018/059753 on Nov. 8, 2018, now Pat. No. 11,151,751.

(51) Int. Cl.
*G06T 11/00* (2006.01)
*G06Q 30/0251* (2023.01)
*G06T 19/00* (2011.01)

(52) U.S. Cl.
CPC .......... *G06T 11/00* (2013.01); *G06Q 30/0261* (2013.01)

(58) Field of Classification Search
CPC .... G06T 11/00; G06T 19/006; G06Q 30/0631
See application file for complete search history.

(56) References Cited

U.S. PATENT DOCUMENTS

| 8,661,033 B2* | 2/2014 | Leppert | G06F 16/9038 |
| | | | 707/732 |
| 9,734,634 B1 | 8/2017 | Mott et al. | |
| 2008/0152197 A1* | 6/2008 | Kawada | H04N 1/2112 |
| | | | 382/115 |

(Continued)

FOREIGN PATENT DOCUMENTS

| JP | 2012048571 A | 3/2012 |
| JP | 2014197317 A | 10/2014 |

(Continued)

OTHER PUBLICATIONS

PCT International Search Report for International Application No. PCT/US2018/059753, dated May 22, 2019 (13 pages).

*Primary Examiner* — Yi Yang
(74) *Attorney, Agent, or Firm* — HALEY GUILIANO LLP (57) ABSTRACT Systems and methods are described for augmenting visual content with a sponsored object instead of a selected object. An illustrative method receives an input selecting an object for augmenting visual content, determines whether a property of the selected object matches a property of a sponsored object included in a database of sponsored objects, and in response to determining that the property of the selected object matches the property of the sponsored object, augments the visual content with the sponsored object.

18 Claims, 10 Drawing Sheets (56) References Cited

U.S. PATENT DOCUMENTS

| | | | |
|---|---|---|---|
| 2009/0182499 A1* | 7/2009 | Bravo | G01C 21/20 |
| | | | 701/408 |
| 2011/0267369 A1* | 11/2011 | Olsen | G01C 21/3682 |
| | | | 345/634 |
| 2012/0128251 A1* | 5/2012 | Petrou | G06V 30/413 |
| | | | 382/182 |
| 2013/0063487 A1* | 3/2013 | Spiegel | G06Q 30/02 |
| | | | 345/633 |
| 2013/0293530 A1 | 11/2013 | Perez et al. | |
| 2014/0132595 A1 | 5/2014 | Boulanger et al. | |
| 2014/0279242 A1 | 9/2014 | Staicut et al. | |
| 2015/0012426 A1* | 1/2015 | Purves | G02B 27/017 |
| | | | 705/41 |
| 2015/0035858 A1* | 2/2015 | Yang | G01C 21/206 |
| | | | 345/629 |
| 2017/0032577 A1* | 2/2017 | Smith | G06F 3/017 |
| 2017/0140484 A1 | 5/2017 | Lete et al. | |
| 2017/0199855 A1 | 7/2017 | Fishbeck | |
| 2017/0308751 A1 | 10/2017 | Kim et al. | |
| 2018/0122142 A1 | 5/2018 | Egeler et al. | |
| 2018/0190324 A1 | 7/2018 | Paul et al. | |
| 2018/0374267 A1* | 12/2018 | Yurkin | G06K 19/06103 |
| 2019/0197599 A1 | 6/2019 | Zia et al. | |
| 2020/0320791 A1* | 10/2020 | Yeh | G06V 40/171 |
| 2022/0222728 A1* | 7/2022 | Gupta | G06Q 30/0201 |

FOREIGN PATENT DOCUMENTS

| | | |
|---|---|---|
| JP | 2015509241 A | 3/2015 |
| JP | 2015207219 A | 11/2015 |
| JP | 2018036813 A | 3/2018 |
| JP | 2019159668 A | 9/2019 |
| WO | 2013103912 A1 | 7/2013 |

\* cited by examiner

METHODS AND SYSTEMS FOR AUGMENTING VISUAL CONTENT

CROSS-REFERENCE TO RELATED APPLICATIONS

This application is a continuation of U.S. patent application Ser. No. 17/253,454, filed Dec. 17, 2020, which is a national stage application under 35 U.S.C. § 371 of International Application PCT/US2018/059753, filed Nov. 8, 2018, each of which is hereby incorporated by reference herein in their entirety.

BACKGROUND

The present disclosure relates to augmenting visual content, and more particularly, to methods and systems for generating for display sponsored augmented reality objects on a user display device in real time or in post-processing.

SUMMARY

Augmented reality (AR) allows a user to view supplemental content superimposed onto an image or view of the real world. For example, in embodiments where the user views an image of the real world on an AR display (such as a smartphone), the supplemental content is overlaid on top of the real-world image as to appear to be part of the real-world image. In other embodiments, where the user views the real world through an AR display (such as AR glasses), the supplemental content is displayed in a portion of the AR display where the user would otherwise see a part of the real world. Such supplemental content enhances the user experience and allows the user to interact with and/or customize the real-world image to their liking. For example, the user can view and/or capture images of the real world with user-selected supplemental content superimposed thereon and/or integrated therein.

This creates an opportunity for application developers to generate revenue from marketers wishing to promote products to the user of the AR display. For example, a common method by which application developers provide free-to-use applications to users is by making the applications "ad-supported," meaning the developers generate income by advertisements placed in the applications instead of the users having to pay to use the applications. However, users often do not like unsolicited or intrusive advertisements appearing in applications. Conventional banner advertisements or pop-up advertisements can be especially bothersome to users of AR displays who want to view images of the real world that are being obscured by intrusive advertisements. There exists, therefore, a need for a way to insert advertisements or other revenue-generating content into images displayed on AR displays that is non-intrusive, and thus preferable, to users of the AR displays.

Accordingly, to overcome such problems, methods and systems are disclosed herein for augmenting visual content with promotional content that is both non-intrusive and specifically tailored to a user. In particular, the embodiments described herein provide for substituting sponsored objects for generic objects selected by a user when augmenting visual content. The sponsored objects may be branded and/or designed to accurately represent products promoted by marketers, thereby allowing the marketers to insert advertisements into the AR content requested by the user, and because the sponsored object is substituted for a generic object selected by the user, the advertisement is both non-intrusive (it is, after all, an object requested by the user) and specifically tailored to the user since the user requested that particular object to be placed in the AR content.

In one illustrative embodiment, a real-world image is displayed on an AR device, such as a smartphone. The real-world image may include a person. The AR device receives a selection of an object with which to augment the real-world image. For example, the AR device displays a list of objects with which the real-world image can be augmented, and a user may select a pair of generic aviator glasses from the list to add to the image of the person. Upon receiving the selection of the object (e.g., the generic aviator glasses), the AR device queries a database of sponsored objects for a sponsored object matching a property of the selected object. For example, a marketer may be promoting aviator glasses of a particular brand, and when the AR device queries the database of sponsored objects for aviator glasses, the database returns the sponsored aviator glasses. The AR device then augments the real-world image with the sponsored aviator glasses instead of the generic aviator glasses selected by the user. For example, the AR device displays the sponsored aviator glasses overlaid onto the image of the person. The AR device may further store the augmented real-world image. This allows the marketer to insert an advertisement (e.g., the sponsored aviator glasses) into augmented content generated based on a selection provided by the user and in a way that is non-intrusive to the user.

In another illustrative embodiment, a real-world environment is viewed through an AR device, such as AR glasses. The real-world environment may include a house with a driveway. The AR device receives a voice command from a user to show a sports car in the house's driveway. A marketer may be promoting a particular sports car, and upon receiving the selection, the AR device queries a database of sponsored objects for a sports car. The database then returns the sponsored sports car, whereafter the AR device substitutes the sponsored sports car for a generic sports car, and generates a display of the sponsored sports car such that when a user views the real-world environment through the AR glasses, the sponsored sports car appears in the house's driveway.

The present disclosure further describes methods and systems for receiving input specifying a target position where the object should be placed in the augmented content. For example, the user may specify that the aviator glasses should be placed on the face of the person in the image, or that the sports car should be placed in the house's driveway. In other embodiments, the methods and systems may automatically determine where to place the object in the augmented content. For example, the AR device may identify the face of the person in the image, retrieve a template of the aviator glasses from the database, and generate a display of the aviator glasses with a size relative to the size of the face of the person in the image, and at an appropriate position in the image (e.g., over the eyes and/or resting on the nose of the person in the image). In some embodiments, the appropriate position in which to place the object in the image may be determined based on one or more anchor points. For example, the nose and/or eyes of the person in the image may serve as anchor points for the aviator glasses, and may be correlated with corresponding anchor points included in the template of the aviator glasses, so as to guide placement and/or sizing of the aviator glasses. In still further embodiments, the methods and systems determine a position of a light source illuminating the real-world image. For example, the AR device determines a direction from which the sun is shining on the house in the real-world environment. The AR device then adjusts a visual characteristic (e.g., a shadow) of the sports car based on the direction from which the sun is shining on the house, such that the shadow generated by the sports car is appropriate for the real-world environment.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
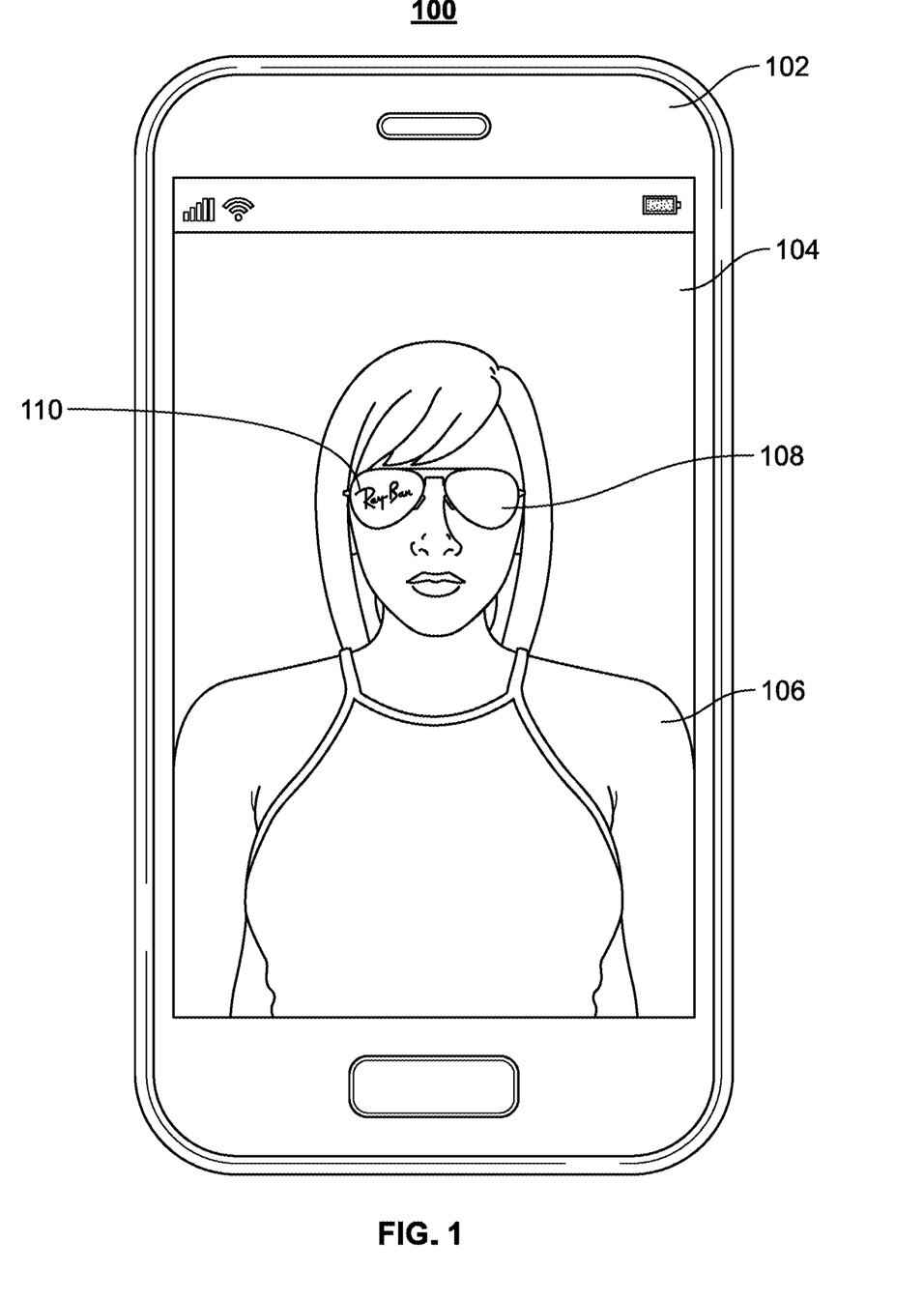
FIG. 1 shows an illustrative example of a user interface for augmenting visual content with a sponsored object, in accordance with some embodiments of the disclosure.

FIG. 1 shows an illustrative example of a user interface for augmenting visual content with a sponsored object, in accordance with some embodiments of the disclosure. In particular, FIG. 1 shows a scenario 100 where an augmented reality (AR) device 102 displays visual content 104, including a subject object 106, that has been augmented with a sponsored object 108 having a branding 110. AR device 102 may be any device capable of displaying visual and/or augmented content, such as a smartphone, tablet computer, AR glasses, AR head-mounted display (HMD), virtual reality (VR) HMD, or any other user equipment usable to display visual content 104, and/or combination of the same.

In that regard, visual content 104 is a live video or other live-captured moving image, three-dimensional image, panoramic or other immersive image (e.g., a 360-degree image or series of live images surrounding a particular viewpoint), live VR or AR renderings, and/or any other live-captured visual media or combination of the same. For example, visual content 104 may be a live-capture or live-stream of images received from one or more lenses or image-capturing devices.

Subject object 106 may be any feature or element included in visual content 104. Subject object 106 may be the focus of visual content 104 (e.g., the visual content may be an image of a person, as shown in FIG. 1), or may be one of a plurality of features or elements included in the visual content. Sponsored object 108 may correspond to a generic object that a user has selected for augmenting visual content 104, as further described below. In some embodiments, sponsored object 108 represents a product that is being promoted by a marketer. For example, as shown in FIG. 1, sponsored object 108 is a pair of aviator glasses with branding 110 "RAY-BAN" included thereon. In an illustrative embodiment described below, the user selects a generic pair of aviator sunglasses with which to augment visual content 104, and AR device 102 instead augments visual content 104 with sponsored object 108 (e.g., the RAY-BAN aviator glasses).

Figure 2A:
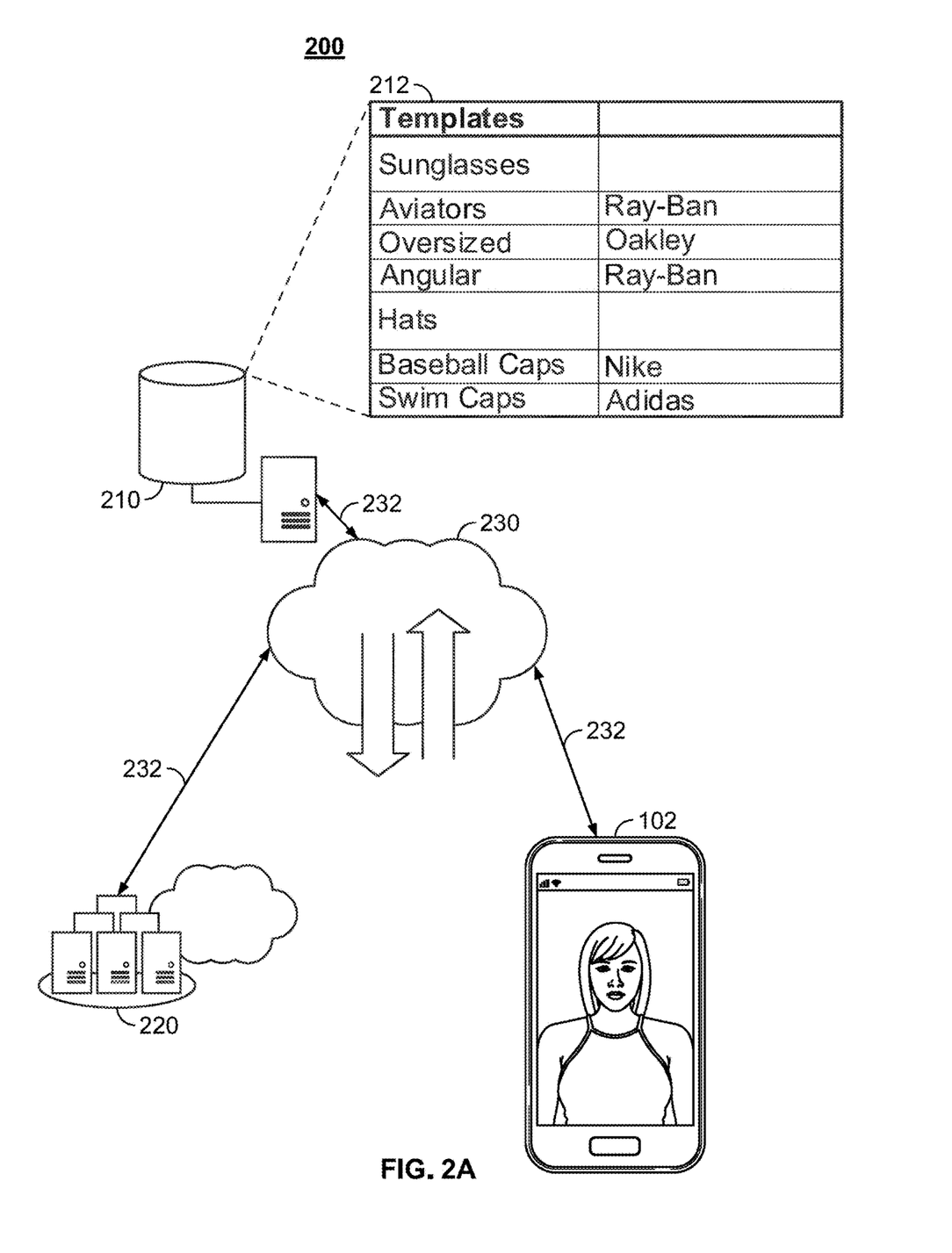
FIG. 2A shows an illustrative system for augmenting visual content with a sponsored object, in accordance with some embodiments of the disclosure.

FIG. 2A shows an illustrative system for augmenting visual content. In particular, FIG. 2A shows a system 200 where AR device 102 displays visual content 104. Visual content 104 may be captured by AR device 102, or may be received from a content source 210 via a communication link 232. Content source 210 may be any server or storage device from which visual content 104 may be retrieved by AR device 102. The communication link 232 may be any network or communication equipment or medium by means of which visual content 104 can be retrieved from content source 210. In one illustrative example, the communication link 232 includes devices connected via the Internet.

One or more applications for augmenting visual content may be implemented on any one or a combination of AR device 102, content source 210, and/or an application server 220, each of which may function as a stand-alone device or may be part of a network of devices. Various network configurations of devices may be implemented and are discussed in more detail below. In the system 200, there may be multiple AR devices 102, but only one is shown in FIG. 2 to avoid overcomplicating the drawing.

AR device 102 may be coupled to a communication network 230. Communication network 230 may be one or more networks including the Internet, a mobile phone network, mobile voice or data network (e.g., a 4G or LTE network), cable network, public switched telephone network, or other types of communication network or combinations of communication networks. Content source 210, application server 220, and AR device 102 may be connected to communication network 230 via one or more communication paths 232, such as, a satellite path, a fiber-optic path, a cable path, free-space connections (e.g., for wireless signals), or any other suitable wired or wireless communication path or combination of such paths.

Although communication paths 232 are not drawn directly between AR device 102 and content source 210 or application server 220, these devices may communicate directly with each other via communication paths 232, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The devices may also communicate with each other directly through an indirect path via communication network 230.

The system 200 may include more than one content source 210, but only one is shown in FIG. 2 to avoid overcomplicating the drawing. In addition to being a source for visual content 104, content source 210 may include one or more databases 212 of sponsored objects 108. Database 212 includes one or more tables of sponsored objects 108 and their corresponding brandings 110. In some embodiments, database 212 includes a table of properties associated with a sponsored object 108. For example, as shown in FIG. 2A, database 212 includes a table in which two types of sponsored objects (e.g., sunglasses and hats) are listed with various properties (e.g., aviators, oversized, angular) and brandings 110 (e.g., RAY-BAN, OAKLEY, NIKE, ADIDAS) associated with each. In some embodiments, content source 210 stores a plurality of templates of sponsored objects 108 associated with each of the sponsored objects 108 included in database 212. The templates of the sponsored objects 108 may include design parameters and/or other data enabling AR device 102 and/or application server 220 to generate an instance (e.g., a rendering) of the associated sponsored object 108. Content source 210 may also include different types of content (including visual content stored by a user), in a location remote from AR device 102.

Metadata may be associated with visual content 104 and/or the selected or sponsored object 108. The metadata may include indications or properties of subject object 106, one or more anchor points or features of subject object 106, properties of sponsored object 108, user preferences, user profile information, and/or any other type of data that enables a computer to match a selected object with a sponsored object 108 and/or determine an appropriate size for and position at which to place sponsored object 108 in visual content 104.

The augmented content generation application may be, for example, a stand-alone application implemented on one or more of the devices described above. For example, the augmented content generation application may be implemented as software or a set of executable instructions which may be stored in storage 308 (described below with reference to FIG. 3), and executed by control circuitry 304 (described below with reference to FIG. 3) of AR device 102. In some embodiments, the augmented content generation application is a client/server application where only a client application resides on AR device 102, and a server application resides on application server 220. For example, an augmented content generation application may be implemented partially as a client application on control circuitry 304 of AR device 102 and partially on application server 220 as a server application running on control circuitry 304 of application server 220. When executed by control circuitry 304 of application server 220, the augmented content generation application may instruct control circuitry 304 to generate the augmented content generation application output (e.g., sponsored object 108 or the augmented visual content) and transmit the generated output to AR device 102. The server application may instruct control circuitry 304 of content source 210 to transmit a template for and/or metadata associated with sponsored object 108 to application server 220 and/or AR device 102. The client application may instruct control circuitry 304 of AR device 102 to generate the augmented content generation application output (e.g., sponsored object 108 and/or the augmented content).

AR device 102 may operate in a cloud computing environment to access cloud services. In a cloud computing environment, various types of computing services for content sharing, storage or distribution (e.g., informational sites or social networking sites) are provided by a collection of network-accessible computing and storage resources, referred to as "the cloud." For example, content source 210 and application server 220 provide computing and storage resources to AR device 102. Cloud resources may be accessed by AR device 102 using, for example, a web browser, a desktop application, a mobile application, and/or any combination of access applications of the same. AR device 102 may be a cloud client that relies on cloud computing for application delivery, or AR device 102 may have some functionality without access to cloud resources. In some embodiments, the AR device 102 uses cloud resources for processing operations, such as the processing operations performed by the processing circuitry 306 of application server 220, described in relation to FIG. 3. Some applications running on AR device 102 may be cloud applications, that is, applications delivered as a service over the Internet, while other applications may be stored and run on AR device 102. An example of such an embodiment is further described below with reference to FIG. 2B.

Figure 2B:
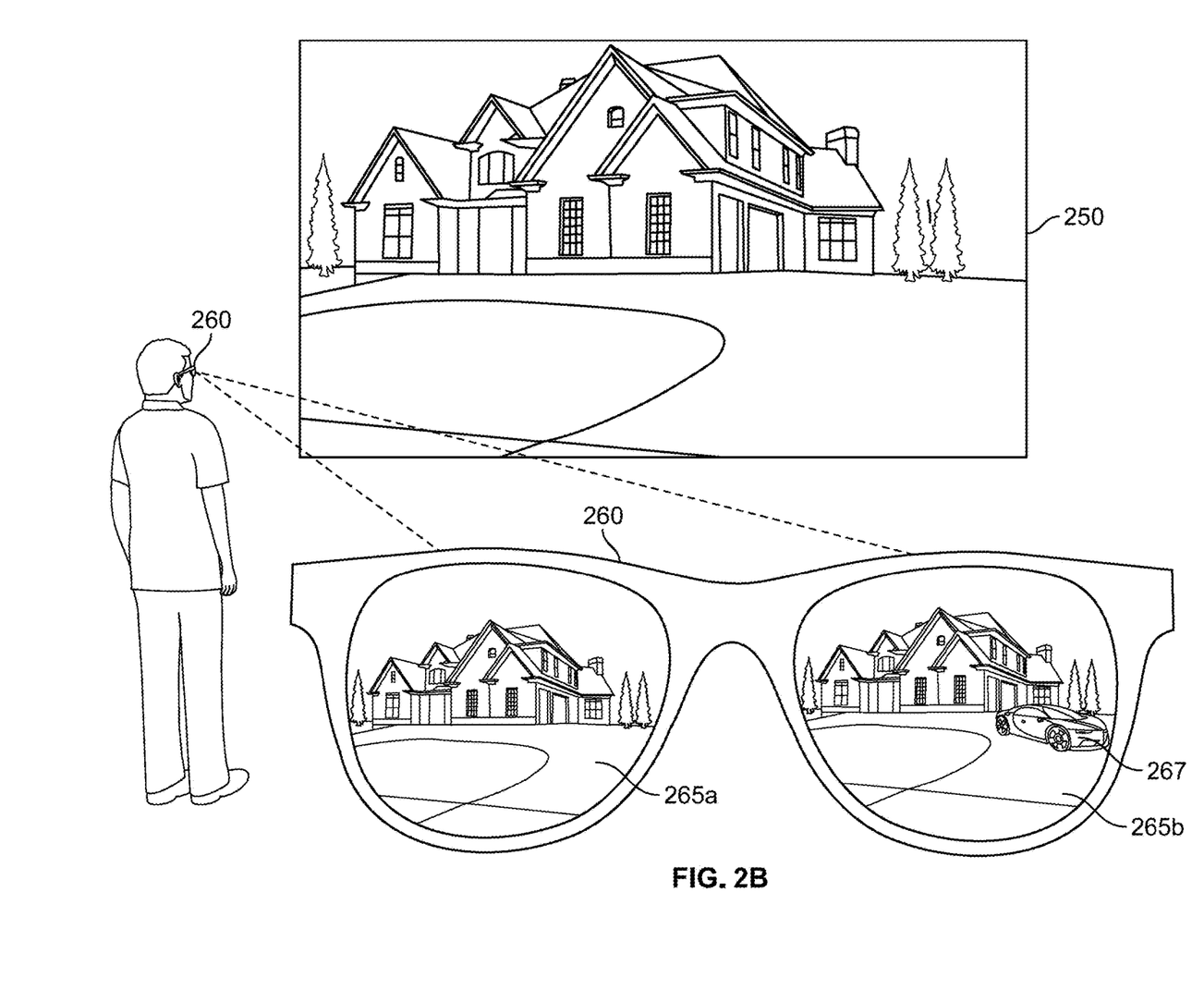
FIG. 2B shows an illustrative scenario for augmenting visual content with a sponsored object, in accordance with some embodiments of the disclosure.

FIG. 2B shows a scenario wherein visual content is augmented with a sponsored object, in accordance with some embodiments of the disclosure. In FIG. 2B, visual content 104 is a real-world view 250 as viewed with an AR device 260. In the example shown in FIG. 2B, real-world view 250 includes a house with a driveway, and a user views real-world view 250 via AR glasses. The user then provides, and AR device 260 receives, an instruction (e.g., a voice command) to augment real-world view 250 with an object. For example, the user may provide a voice command to "show a sports car in the driveway."

Upon receiving the instruction, AR device 260 sends a request to application server 220 to augment real-world view 250 with the object selected by the user. Application server 220 identifies a property of the selected object (e.g., that the object is a sports car), and queries database 212 of the content server 210 for a sponsored object 108 matching the property of the selected object. The content server 210 then returns a matching sponsored object 108 (e.g., a template of a sponsored sports car) to application server 220. Upon receiving sponsored object 108, application server 220 generates an instance of sponsored object 108 based on the template to provide to AR device 260 or provides the template of sponsored object 108 to AR device 260.

AR device 260 then generates for display sponsored object 108. For example, as shown in FIG. 2B, the AR glasses includes a left view 265a and a right view 265b. Left view 265a matches real-world view 250. Right view 265b shows real-world view 250 with an instance 267 of sponsored object 108 overlaid thereon. For example, right view 265b shows a sports car 267 in the driveway of the house. In some embodiments, both left view 265a and right view 265b of AR device 260 display instance 267 of sponsored object 108.

Figure 3:
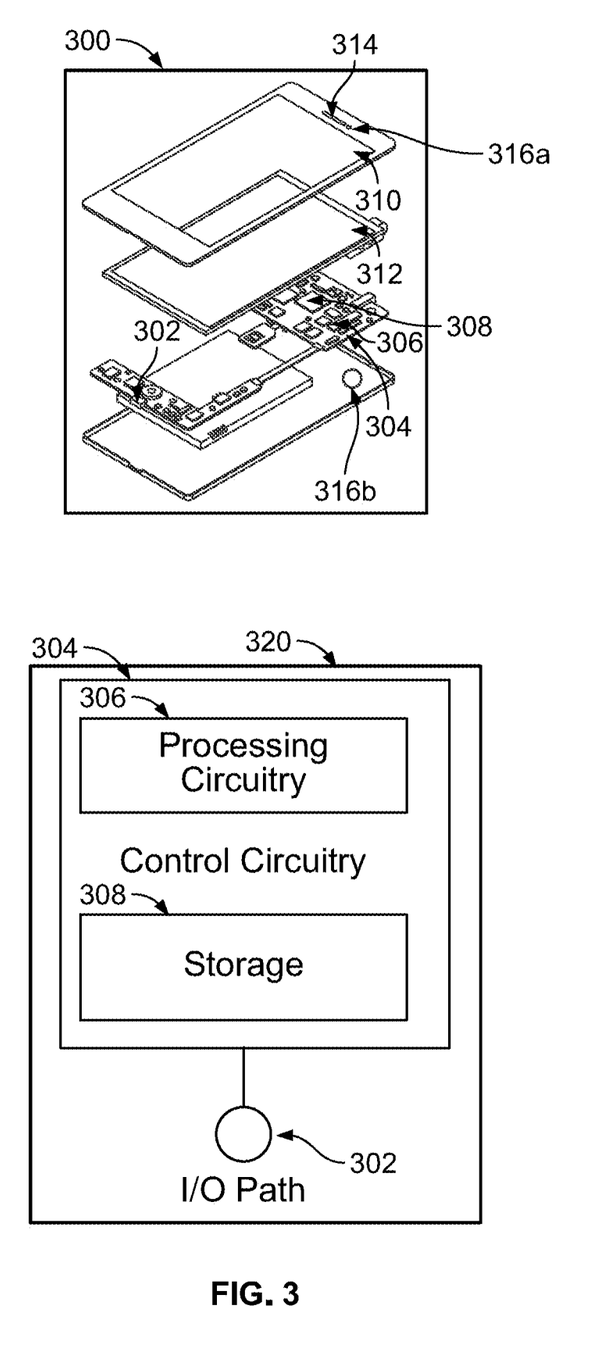
FIG. 3 shows a diagram of illustrative devices of the system of FIG. 2A, in accordance with some embodiments of the disclosure.

FIG. 3 shows a generalized embodiment of illustrative user device 300 and server device 320. As depicted, user device 300 may be a smartphone or tablet, although those skilled in the art will appreciate that various other devices, such as cameras, AR or virtual reality glasses or other head-mounted displays, etc., may be also be used for augmenting visual content with a sponsored object, and may have the same or similar components to those of user device 300. The user devices 300 may receive content and data via an input/output (hereinafter "I/O") path 302. I/O path 302 may provide visual content (e.g., Internet content, content available over a local area network (LAN) or wide area network (WAN), and/or other content), objects for augmenting the visual content, and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communication paths (described below). I/O functions may be provided by one or more of these communication paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an augmented content generation application stored in memory (i.e., storage circuitry 308). Specifically, control circuitry 304 may be instructed by the augmented content generation application to perform the functions discussed above and below.

In client/server-based embodiments, control circuitry 304 includes communication circuitry suitable for communicating with an augmented content generation application server or other networks or servers. The instructions for carrying out the above-mentioned functionality may be stored on a server. The communication circuitry may include a cable modem, an integrated services digital network (ISDN) modem, a digital subscriber line (DSL) modem, a telephone modem, Ethernet card, or a wireless modem for communication with other equipment, or any other suitable communication circuitry. Such communication may involve the Internet or any other suitable communication networks or paths. In addition, communication circuitry may include circuitry that enables peer-to-peer communication of devices, or communication of devices in locations remote from each other.

Memory may be an electronic storage device provided as storage circuitry 308 that is part of control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, or any other suitable fixed or removable storage devices, and/or any combination of the same. Nonvolatile memory may also be used (e.g., to launch a boot-up routine and other instructions). Cloud-based storage, described in relation to FIG. 2, may be used to supplement storage circuitry 308 or instead of storage circuitry 308.

Control circuitry 304 may include image-generating circuitry and/or image-processing circuitry. Control circuitry 304 may be used by user device 300 to receive and to display, to play, and/or to record visual content and/or augmented content. The circuitry described herein, including, for example, the image-generating circuitry or image-processing circuitry, may be implemented using software running on one or more general purpose or specialized processors. If storage circuitry 308 is provided as a separate device from user device 300, the image-generating circuitry or image-processing circuitry may be associated with storage circuitry 308.

Server device 320 may be implemented in a single, array, and/or cloud architecture. Server device 320 includes an I/O path 302 connected to control circuitry 304 including processing circuitry 306 and storage circuitry 308. I/O path 302, control circuitry 304, processing circuitry 306, and storage circuitry 308 of server device 320 may be similar to I/O path 302, control circuitry 304, processing circuitry 306, and storage circuitry 308 of user device 300, and may have similar features and functionality.

A user may send instructions to control circuitry 304 using a user input interface 310 of user device 300. User input interface 310 may be any suitable user interface, such as a remote control, mouse, trackball, keypad, keyboard, touchscreen, touchpad, stylus input, joystick, voice recognition interface, or other user input interfaces. Display 312 may be a touchscreen or touch-sensitive display. In such circumstances, user input interface 310 may be integrated with or combined with display 312. Speakers 314 may be provided as integrated with other elements of user device 300. User device 300 may further include one or more lenses 316a and/or 316b. Lenses 316a, 316b may be used to capture visual content, as described herein.

The augmented content generation application may be implemented using any suitable architecture. For example, it may be a stand-alone application wholly implemented on user device 300. The augmented content generation application and/or any instructions for performing any of the embodiments described herein may be encoded on computer-readable media. Computer-readable media includes any media capable of storing data. In some embodiments, the content generation application is a client/server-based application. Data for use by a thick or thin client implemented on user device 300 is retrieved on demand by issuing requests to a server, such as server device 320, remote from user device 300. For example, user device 300 may receive inputs from the user via the input interface 310 and transmit those inputs to the remote server for processing and generating the corresponding outputs. The generated output is then transmitted to the user device 300 for presentation to the user. Those skilled in the art will appreciate that AR device 102 of FIG. 1 and AR device 260 of FIG. 2B may be implemented as user device 300 of FIG. 3.

Figure 4:
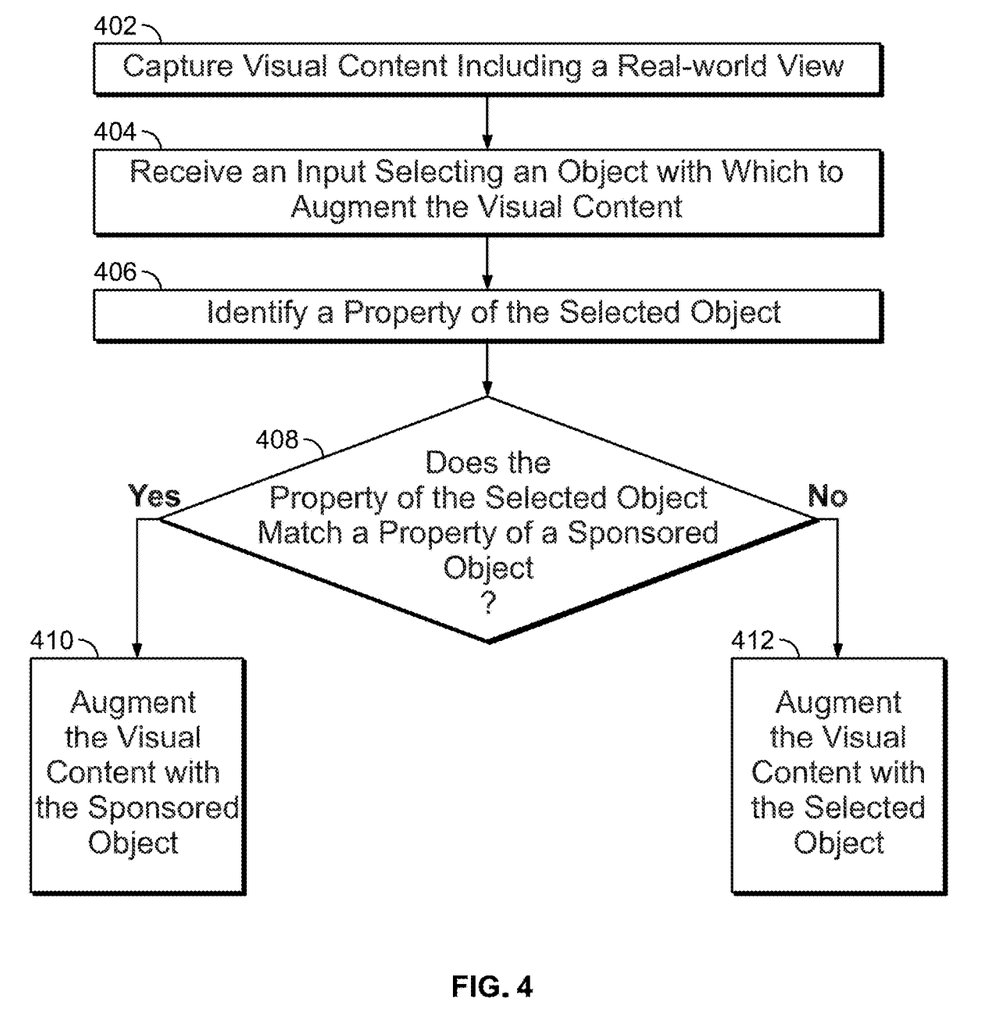
FIG. 4 is a flowchart of an illustrative process for augmenting visual content with a sponsored object, in accordance with some embodiments of the disclosure.

FIG. 4 is a flowchart of an illustrative process for augmenting visual content with a sponsored object, in accordance with some embodiments of the disclosure. A process 400 for providing augmenting visual content with a sponsored object may begin at block 402, where control circuitry, such as control circuitry 304 described above, captures visual content 104 including a real-world view 250. Control circuitry 304 may capture visual content 104 via one or more lenses 316. In some embodiments, control circuitry 304 retrieves visual content 104 from storage 308. For example, control circuitry 304 may capture an image of a person.

At block 404, control circuitry 304 receives an input selecting a generic object with which to augment visual content 104. Control circuitry 304 may receive the input via user input interface 310. For example, control circuitry 304 receives a touch input from the user via user input interface 310 selecting the generic object with which to augment visual content 104 or receives a voice command selecting the generic object with which to augment visual content 104. In some embodiments, display 312 displays a list of available generic objects, and control circuitry 304 then receives a selection via user input interface 310 of one of the available generic objects.

At block 406, control circuitry 304 identifies a property of the selected object. Control circuitry 304 may analyze metadata associated with the selected object to identify the property of the selected object. In some embodiments, control circuitry 304 processes audio received as part of a voice command to identify the property of the selected object. The property of the selected object may be an explicit property (e.g., the voice command may specify the property of the selected object) or an implicit property (e.g., control circuitry 304 first needs to identify what the selected object is in order to identify the property of the selected object). For example, control circuitry 304 may receive a voice command from the user, determine that the voice command includes an instruction to augment visual content 104 with aviator glasses, and then identify a property of aviator glasses (e.g., a keyword, identifier, characteristic, etc.).

At block 408, control circuitry 304 determines whether the property of the selected object matches a property of a sponsored object 108. As further described below with reference to FIG. 6, control circuitry 304 may query a database 212 of sponsored objects for a sponsored object matching the property of the selected object identified at block 406. In response to determining that the property of the selected object matches a property of a sponsored object 108, the process 400 proceeds to block 410. In response to determining that the property of the selected object does not match a property of any sponsored objects, the process 400 proceeds to block 412.

At block 410, control circuitry 304 augments visual content 104 with sponsored object 108 instead of the selected object. As described further below with reference to FIGS. 5 and 7-9, control circuitry 304 may overlay sponsored object 108 onto visual content 104, or may generate augmented content including sponsored object 108 and visual content 104. For example, control circuitry 304 may overlay sponsored aviator glasses onto the image of the person.

At block 412, control circuitry 304 augments the visual content with the selected object. For example, control circuitry 304 overlays the generic object selected at block 404 onto visual content 104.

Figure 5:
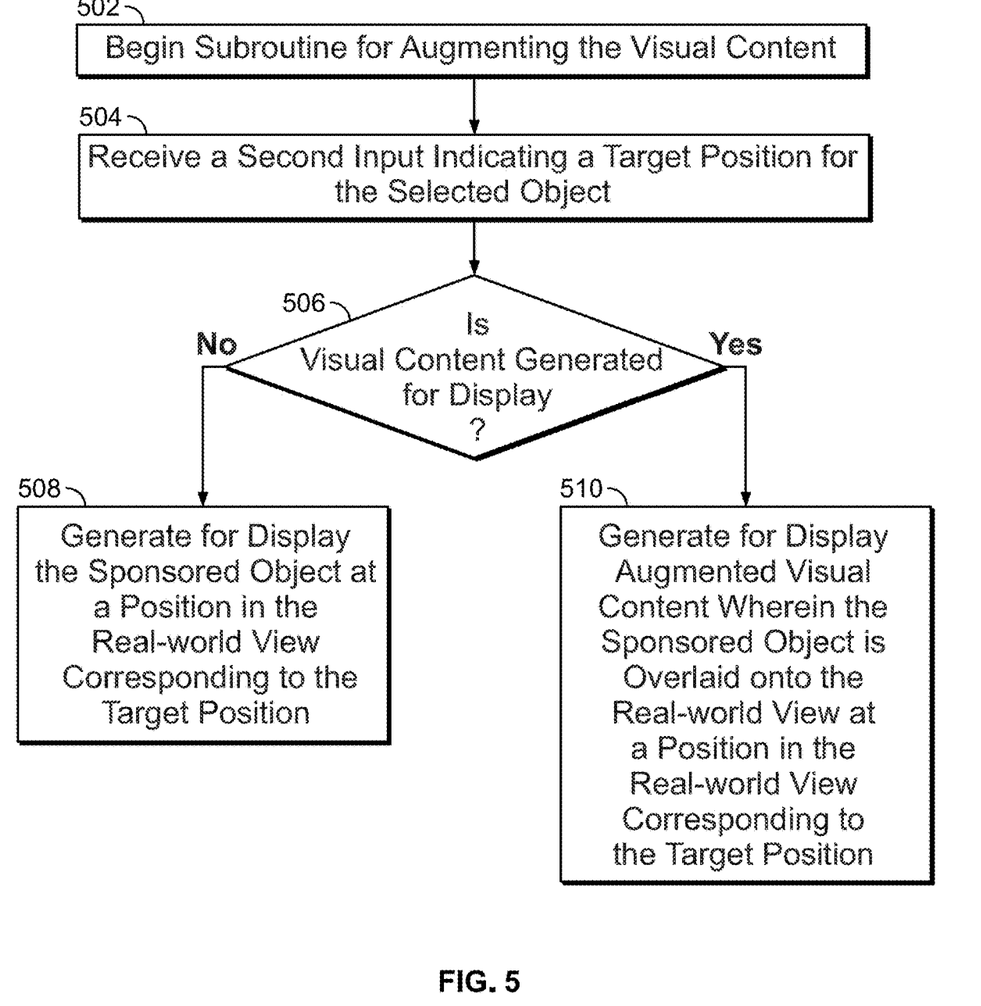
FIG. 5 is a flowchart of a detailed illustrative process for generating augmented visual content, in accordance with some embodiments of the disclosure.

FIG. 5 is a flowchart of a detailed illustrative process for augmenting visual content 104 with a sponsored object 108, in accordance with some embodiments of the disclosure. A process 500 for augmenting visual content may begin at block 502.

At block 504, control circuitry 304 receives a second input indicating a target position for the selected object. Control circuitry 304 may receive the second input via user input interface 310, such as via a touch input from the user specifying a position in visual content 104 in which to place the selected object. In some embodiments, control circuitry 304 receives the second input as a voice command, either together with or separate from the first voice command selecting the object, specifying where to place the selected object. For example, control circuitry 304 receives a voice command instructing control circuitry 304 to "show a sports car in the driveway." Control circuitry 304 may then process the voice command to determine that the sports car is the selected object and the driveway is the target position.

At block 506, control circuitry 304 determines whether visual content 104 is being generated for display. Control circuitry 304 may determine whether visual content 104 captured at block 402 is being generated for display (e.g., visual content 104 is displayed on AR device 102), or was merely captured for processing purposes (e.g., visual content 104 is not displayed, that is, real-world view 250 is viewed through AR device 260). In response to determining that visual content 104 is not being generated for display, the process 500 proceeds to block 508. In response to determining that visual content 104 is being generated for display, the process 500 proceeds to block 510.

At block 508, control circuitry 304 generates for display sponsored object 108 at a position in real-world view 250 corresponding to the target position. For example, control circuitry 304 generates for display the sponsored sports car such that it appears to be in the driveway. In that regard, the target position, once identified, may be a fixed position in real-world view 250, and control circuitry 304 determines where on the display of AR device 260 to display sponsored object 108 such that it appears to be at the target position in real-world view 250.

At block 510, control circuitry 304 generates for display augmented visual content wherein the sponsored object is overlaid onto real-world view 250 at a position in real-world view 250 corresponding to the target position. For example, control circuitry 304 identifies a position on visual content 104 matching the target position, and overlays sponsored object 108 onto visual content 104 at the position matching the target position.

Figure 6:
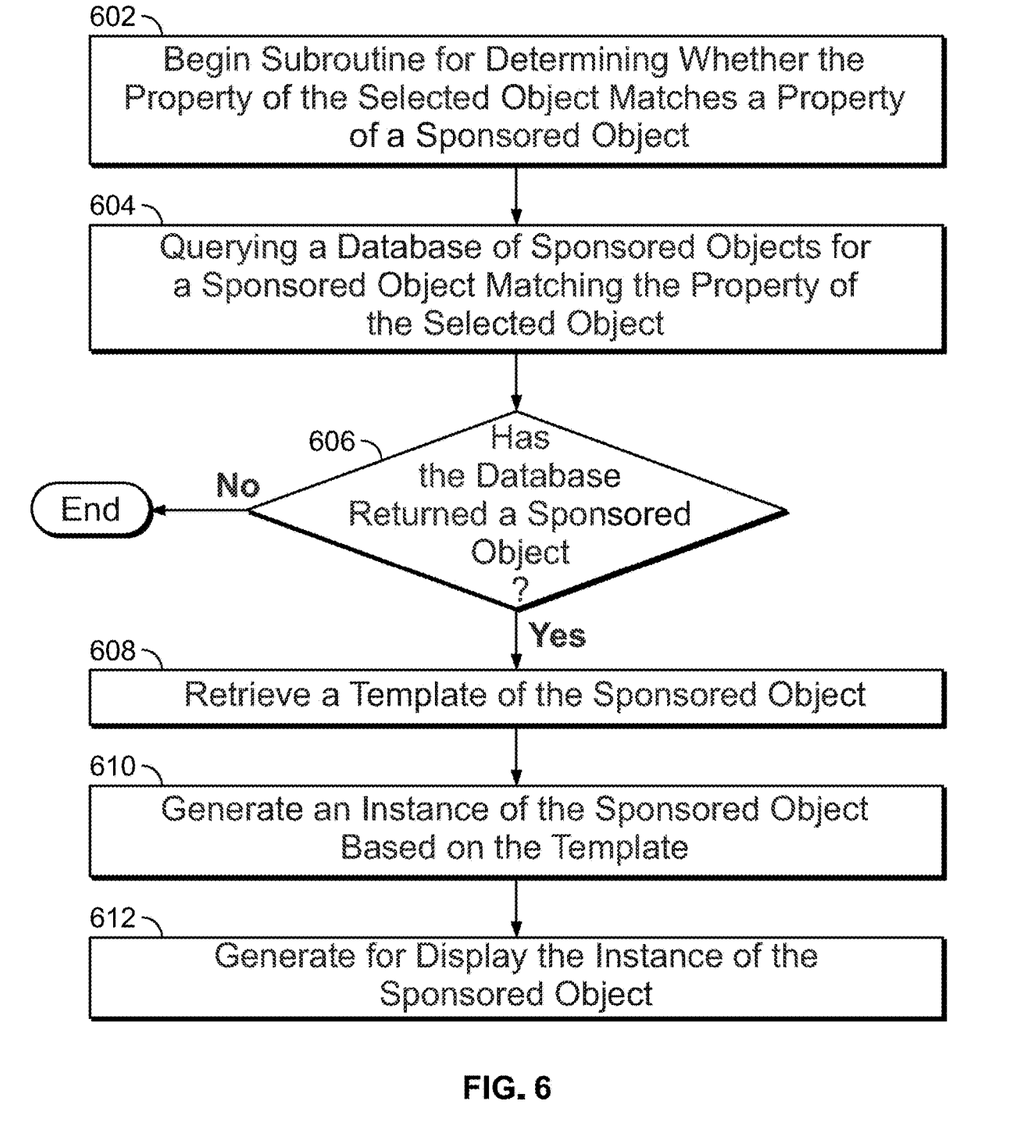
FIG. 6 is a flowchart of a detailed illustrative process for determining whether a property of a selected object matches a property of a sponsored object, in accordance with some embodiments of the disclosure.

FIG. 6 is a flowchart of a detailed illustrative process for determining whether a property of a selected object matches a property of a sponsored object 108, in accordance with some embodiments of the disclosure. A process 600 for determining whether a property of a selected object matches a property of a sponsored object 108 may begin at block 602.

At block 604, control circuitry 304 queries a database 212 of sponsored objects 108 for a sponsored object 108 matching the property of the selected object identified at block 406. In some embodiments, control circuitry 304 sends a request for a sponsored object 108 matching the property of the selected object identified at block 406 to the content server 210, and the content server 210 queries database 212 for sponsored objects 108 matching the identified property.

At block 606, control circuitry 304 determines whether database 212 has returned a sponsored object 108 matching property of the selected object identified at block 406. For example, control circuitry 304 determines whether any objects were returned in response to the query of block 604. In response to determining that database 212 has not returned any sponsored objects 108, the process 600 ends. In response to determining that database 212 has returned a sponsored object 108, the process 600 proceeds to block 608.

At block 608, control circuitry 304 retrieves a template of sponsored object 108 matching the property of the selected object identified at block 406. Control circuitry 304 may retrieve the template of sponsored object 108 from content source 210 and/or from database 212. For example, database 212 may return an identifier of a sponsored object 108 in response to the query of block 604, and control circuitry 304 then retrieves a sponsored object 108 matching the identifier from content source 210.

At block 610, control circuitry 304 generates an instance of sponsored object 108 based on the template retrieved at block 608. For example, the template may include design specifications and/or other data describing sponsored object 108, and control circuitry 304 may generate the instance of sponsored object 108 according to the design specifications.

At block 612, control circuitry 304 generates for display the instance of sponsored object 108 generated at block 610.

For example, control circuitry 304 may cause AR device 102 and/or AR device 260 to display the instance of sponsored object 108, as described at blocks 410, 508, and/or 510.

Figure 7:
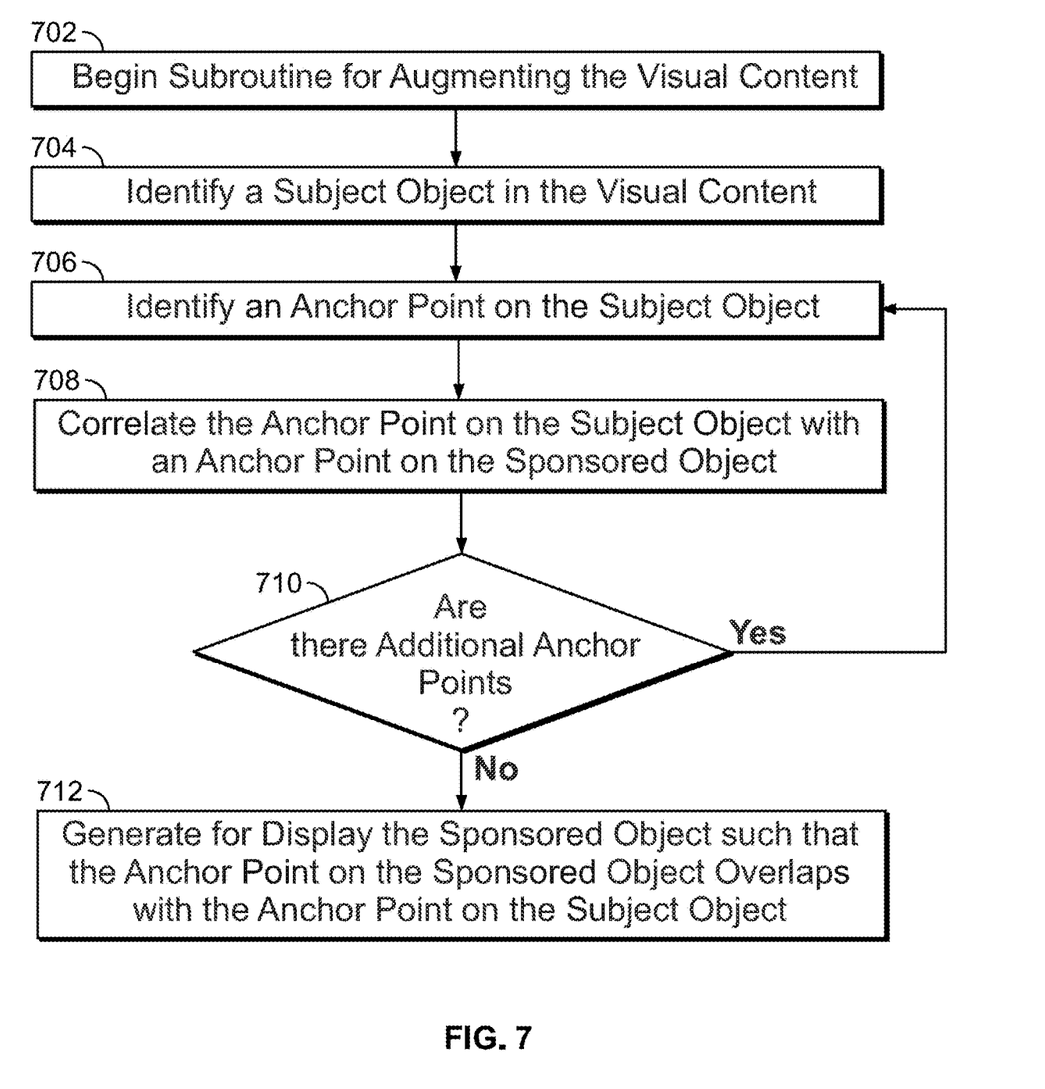
FIG. 7 is a flowchart of a detailed illustrative process for positioning a sponsored object in visual content, in accordance with some embodiments of the disclosure.

FIG. 7 is a flowchart of a detailed illustrative process for augmenting visual content 104 with a sponsored object 108, in accordance with some embodiments of the disclosure. A process 700 for augmenting visual content may begin at block 702.

At block 704, control circuitry 304 identifies a subject object 106 in visual content 104. For example, control circuitry 304 processes visual content 104, such as by using object detection and/or pattern recognition algorithms, to identify a subject object 106 in visual content 104. In some embodiments, subject object 106 is a focus of visual content 104. For example, in an embodiment where visual content 104 is an image of a person, the person is subject object 106 in visual content 104. In another example where the visual content is a real-world view 250 of a house with a driveway, the driveway may be subject object 106. Subject object 106 may be specified in input received from a user or may be automatically determined based on visual content 104. For example, if the user provides a command instructing AR device 260 to "show a sports car in the driveway," control circuitry 304 may determine that the user's specification of the driveway indicates subject object 106 in visual content 104, and may then process visual content 104 to identify the driveway.

At block 706, control circuitry 304 identifies an anchor point on subject object 106. For example, control circuitry 304 determines whether subject object 106 includes any identifiable landmarks. In embodiments where subject object 106 is a person, the landmarks may be facial features, such as the person's eyes or nose, and control circuitry 304 may identify the person's eyes or nose in visual content 104. Control circuitry 304 may then identify one or more of the facial features as an anchor point. In some embodiments, control circuitry 304 determines the landmarks to identify based on a type of subject object 106 identified at block 704. For example, if control circuitry 304 identifies subject object 106 as being a person, control circuitry 304 may query a database for potential landmarks and/or templates of landmarks that may be included in an image of a person, and then process visual content 104 to identify the potential landmarks in visual content 104, and therefrom the anchor points.

At block 708, control circuitry 304 correlates the anchor point on subject object 106 with an anchor point on sponsored object 108. For example, control circuitry 304 may retrieve metadata associated with sponsored object 108 to identify anchor points on sponsored object 108. The metadata may further indicate which anchor points on sponsored object 108 correspond to which types of anchor points on subject object 106. For example, the metadata may indicate that a particular anchor point on sponsored object 108 should be correlated with an anchor point on the bridge of a person's nose. Control circuitry 304 then determines which anchor points on sponsored object 108 has been identified, and whether those anchor points match any of the anchor points indicated in the metadata.

At block 710, control circuitry 304 determines whether there are any additional anchor points on subject object 106 to be identified. For example, control circuitry 304 may determine, based on the type of the subject object identified at block 704, whether there are any known potential landmarks remaining to be identified, and that, if so, there are thus additional anchor points associated with those landmarks to be identified. In response to determining that there are additional anchor points on subject object 106 to be identified, the process 700 returns to block 706. In response to determining that there are no additional anchor points on subject object 106 to be identified, the process 700 proceeds to block 712.

At block 712, control circuitry 304 generates for display sponsored object 108 such that the anchor points on sponsored object 108 identified at block 708 overlap with the anchor points on subject object 106 identified at block 706. For example, control circuitry 304 overlays sponsored object 108 onto visual content 104 such that the anchor points on sponsored object 108 overlap with the anchor points on subject object 106.

Figure 8:
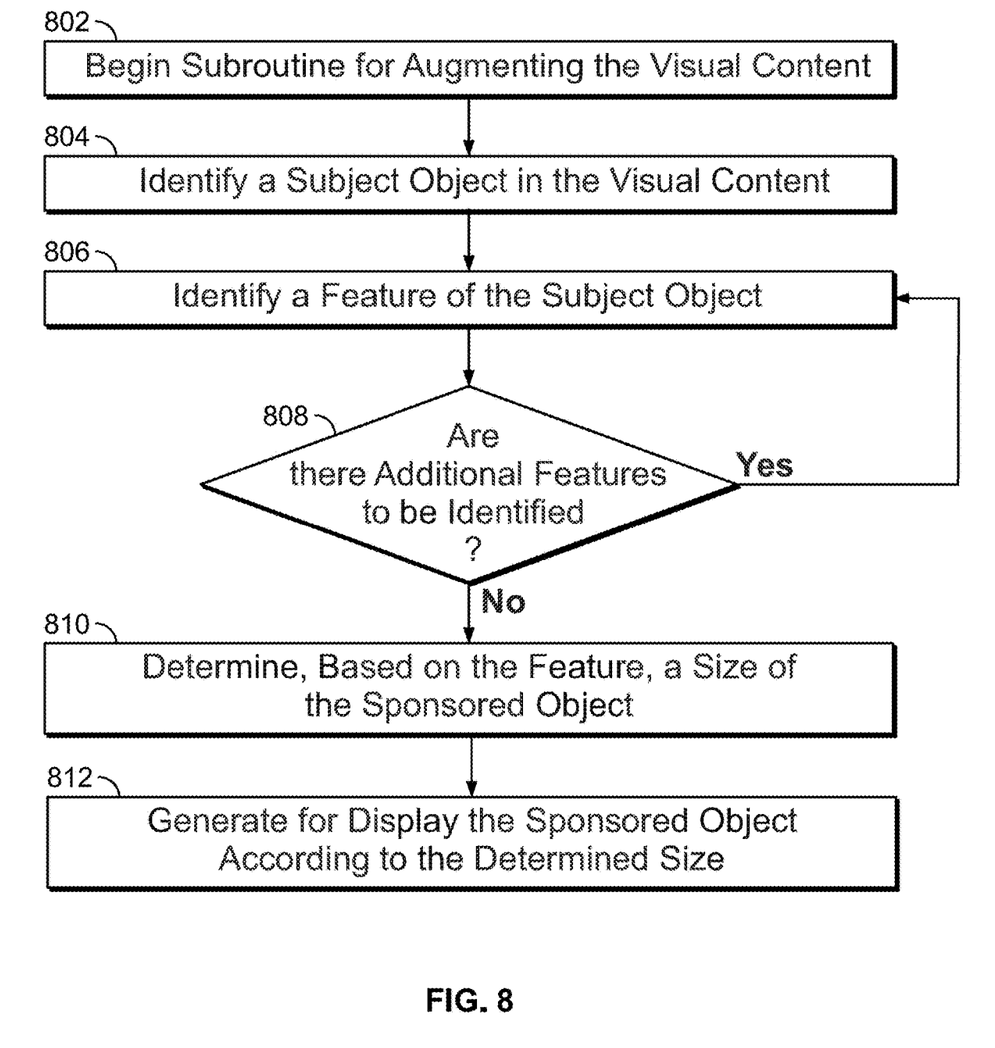
FIG. 8 is a flowchart of another detailed illustrative process for positioning a sponsored object in visual content, in accordance with some embodiments of the disclosure.

FIG. 8 is a flowchart of a detailed illustrative process for augmenting visual content 104 with a sponsored object 108, in accordance with some embodiments of the disclosure. A process 800 for augmenting visual content may begin at block 802.

At block 804, control circuitry 304 identifies subject object 106 in the visual content 104. The process for identifying subject object 106 may be similar to the process described at block 704, and will not be repeated for the purpose of brevity.

At block 806, control circuitry 304 identifies a feature of subject object 106. In some embodiments, after identifying subject object 106 in visual content 104, control circuitry 304 retrieves data indicating potential features of subject object 106. For example, if control circuitry 304 identifies subject object 106 as being a person, control circuitry 304 may retrieve data from content source 210 indicating the types of features found on a person. The features of subject object 106 may be the head of subject object 106 or some other part indicative of a relative size of subject object 106. Control circuitry 304 may then identify the features in the visual content.

At block 808, control circuitry 304 determines whether there are additional features to be identified. For example, control circuitry 304 may determine whether each of the potential features of subject object 106 retrieved from content source 210 have been identified or determined to be unidentifiable in visual content 104. In response to determining that there are additional features of subject object 106 to be identified, the process 800 returns to block 806. In response to determining that there are no additional features of subject object 106 left to be identified, the process 800 proceeds to block 810.

At block 810, control circuitry 304 determines a size of sponsored object 108. For example, control circuitry 304 may determine, based on the size of a feature of subject object 106 identified at block 806, what the relative size of sponsored object 108 should be. In some embodiments, control circuitry 304 retrieves data (e.g., from the metadata associated with sponsored object 108) indicating the relative size of sponsored object 108 to the feature of the subject object 106.

At block 812, control circuitry 304 generates for display sponsored object 108 according to the size determined at block 810. For example, control circuitry 304 generates an instance of sponsored object 108 based on a template retrieved from content source 210, and scales the instance according to the data indicating the relative size of sponsored object 108 to the feature of subject object 106.

Figure 9:
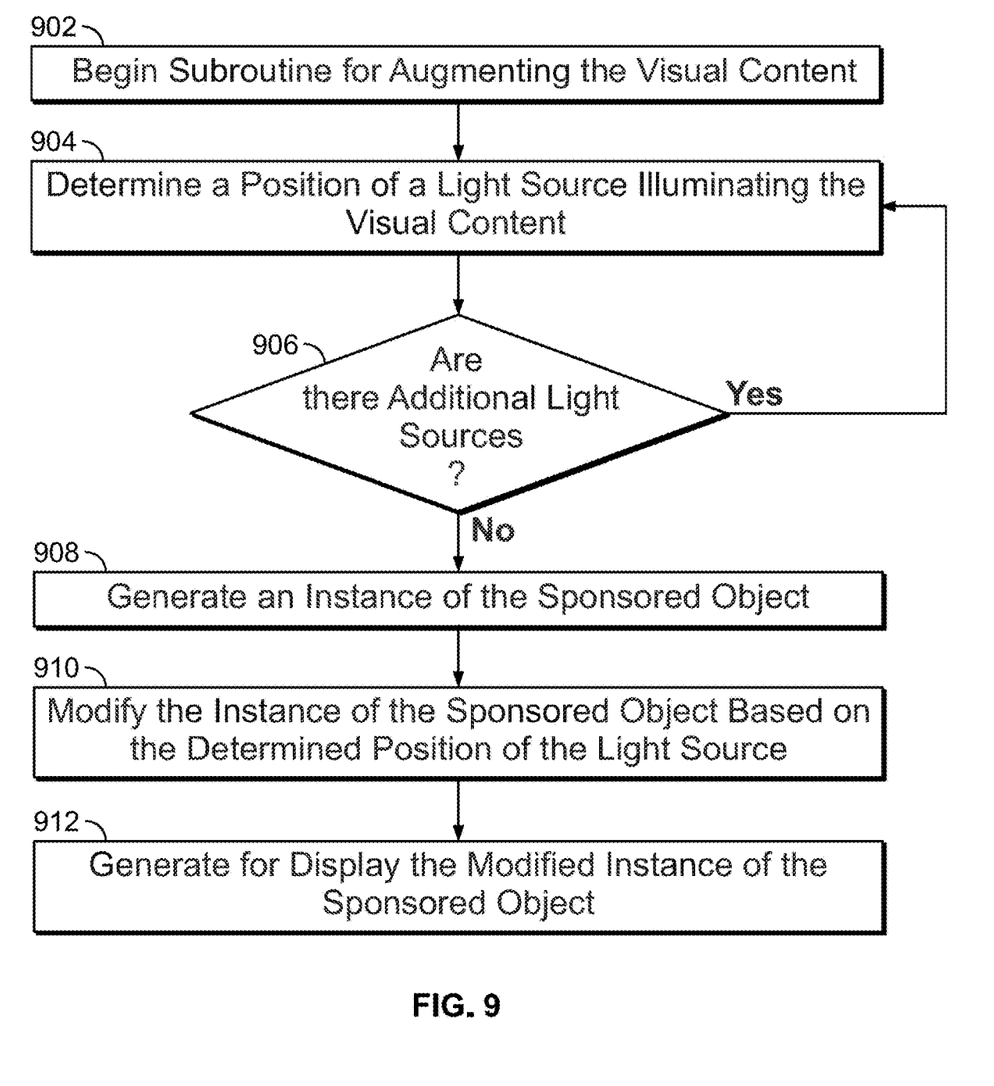
FIG. 9 is a flowchart of a detailed illustrative process for modifying a sponsored object based on a light source illuminating visual content, in accordance with some embodiments of the disclosure.

FIG. 9 is a flowchart of a detailed illustrative process for augmenting visual content 104 with a sponsored object 108, in accordance with some embodiments of the disclosure. A process 900 for augmenting visual content may begin at block 902.

At block 904, control circuitry 304 determines a position of a light source illuminating visual content 104. For example, control circuitry 304 processes visual content 104 to identify shadows or areas of relatively high luminosity and areas of relatively low luminosity. Control circuitry 304 then determines an angle of the shadows, or determines a relative position of the areas of high luminosity to the areas of low luminosity, and determines, based on the angle of the shadows, or the relative position of the areas of high luminosity to the areas of low luminosity, a position of a light source illuminating visual content 104.

At block 906, control circuitry 304 determines whether there are additional light sources illuminating visual content 104. For example, control circuitry 304 determines whether the angle of the shadows and/or relative position of the areas of high luminosity to the areas of low luminosity indicate that an unidentified light source is illuminating visual content 104. In response to determining that there are additional light sources illuminating visual content 104, the process 900 returns to block 904. In response to determining that there are no additional light sources illuminating visual content 104, the process 900 proceeds to block 908.

At block 908, control circuitry 304 generates an instance of sponsored object 108. For example, as described at block 610, control circuitry 304 retrieves a template of sponsored object 108 and generates for display the instance of sponsored object 108 based on design specifications included in the template.

At block 910, control circuitry 304 modifies the instance of sponsored object 108 based on the position of the light source determined at block 904. For example, control circuitry 304 may adjust the color, brightness, luminosity, and/or shadows of the instance of sponsored object 108 based on the determined position of the light source.

At block 912, control circuitry 304 generates for display the modified instance of sponsored object 108. For example, as described at block 612, control circuitry 304 overlays the modified instance of sponsored object 108 onto visual content 104.

It should be noted that processes 400-900 or any step thereof could be performed on, or provided by, any of the devices shown in FIGS. 1-3. For example, the processes may be executed by control circuitry 304 (FIG. 3) as instructed by an augmented content generation application implemented on an AR device 102, content source 210, and/or application server 220. In addition, one or more steps of a process may be omitted, modified, and/or incorporated into or combined with one or more steps of any other process or embodiment (e.g., steps from process 600 may be combined with steps from process 800). In addition, the steps and descriptions described in relation to FIGS. 4-9 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method comprising:
generating for display an image of a person;
receiving, via a user interface, a selection of an object to be overlaid on the image of the person, wherein the selected object is associated with a first table of properties for rendering the selected object;
identifying an anchor point on the image of the person where the object is to be overlaid;
determining whether the first table of properties of the selected object comprises a feature that is also included in a second table of properties, different from the first table of properties, for rendering a sponsored object, wherein the second table of properties is included in an augmentation database storing indications of sponsored objects and corresponding properties; and
in response to determining that the first table of properties of the selected object comprises the feature that is also included in the second table of properties for rendering the sponsored object:
generating for display the sponsored object at the identified anchor point by automatically causing the image of the person to be overlaid with the sponsored object, wherein the sponsored object is rendered using the second table of properties instead of the first table of properties associated with the selected object, wherein the sponsored object is displayed without user interface selection of the sponsored object, and wherein the sponsored object is visually distinguishable from the selected object.

2. The method of claim 1, wherein the image of the person is included in a live video captured by a camera and being generated for display.

3. The method of claim 1, wherein:
the feature of the selected object is a type of the object,
the sponsored object is of the same type as the selected object, and
the sponsored object comprises an indication of a branding.

4. The method of claim 1, wherein the sponsored object is selected at least in part based on a user profile associated with the person depicted in the image.

5. The method of claim 1, further comprising:
in response to determining that the selected object is not associated with the feature that is included in the second table of properties included in the augmentation database, automatically causing the image of the person to be overlaid with the selected object.

6. The method of claim 1, wherein generating for display the sponsored object based at least in part on the anchor point comprises:
- correlating the anchor point on the image of the person with an anchor point on the sponsored object; and
- generating for display the sponsored object such that the anchor point on the sponsored object overlaps the anchor point on the image of the person.

7. The method of claim 1, wherein the anchor point is associated with facial features or a head of the person in the image.

8. The method of claim 1, further comprising:
- receiving input specifying a target position where the selected object should be placed, wherein the sponsored object is overlaid on the image of the person at the specified target position.

9. The method of claim 1, further comprising:
- automatically determining an appropriate position where the sponsored object should be overlaid on the image of the person, based at least in part on a size of a depicted portion of the person in the image and a type of sponsored object.

10. A computer-implemented system comprising:
- an augmentation database configured to store indications of sponsored objects and corresponding features;
- control circuitry configured to:
  - generate for display an image of a person;
  - receive, via a user interface, a selection of an object to be overlaid on the image of the person, wherein the selected object is associated with a first table of properties for rendering the selected object;
  - identify an anchor point on the image of the person where the object is to be overlaid; and
  - determine whether the first table of properties of the selected object comprises a feature that is also included in a second table of properties, different from the first table of properties, for rendering a sponsored object, wherein the second table of properties is included in the augmentation database storing the indications of the sponsored objects and the corresponding properties; and
- input/output (I/O) circuitry configured to:
  - in response to determining that the first table of properties of the selected object comprises the feature that is also included in the second table of properties for rendering the sponsored object:
    - generate for display the sponsored object at the anchor point by automatically causing the image of the person to be overlaid with the sponsored object, wherein the sponsored object is rendered using the second table of properties instead of the first table of properties associated with the selected object, wherein the sponsored object is displayed without user interface selection of the sponsored object, and wherein the sponsored object is visually distinguishable from the selected object.

11. The system of claim 10, wherein the image of the person is included in a live video captured by a camera and being generated for display.

12. The system of claim 10, wherein:
- the feature of the selected object is a type of the object,
- the sponsored object is of the same type as the selected object, and
- the sponsored object comprises an indication of a branding.

13. The system of claim 10, wherein the sponsored object is selected at least in part based on a user profile associated with the person depicted in the image.

14. The system of claim 10, wherein the I/O circuitry is further configured to:
- in response to determining that the selected object is not associated with the feature that is included in the second table of properties included in the augmentation database, automatically cause the image of the person to be overlaid with the selected object.

15. The system of claim 10, wherein the I/O circuitry is configured to generate for display the sponsored object based at least in part on the anchor point by:
- correlating the anchor point on the image of the person with an anchor point on the sponsored object; and
- generating for display the sponsored object such that the anchor point on the sponsored object overlaps the anchor point on the image of the person.

16. The system of claim 10, wherein the anchor point is associated with facial features or a head of the person in the image.

17. The system of claim 10, wherein the control circuitry is further configured to:
- receive input specifying a target position where the selected object should be placed, wherein the sponsored object is overlaid on the image of the person at the specified target position.

18. The system of claim 10, wherein the control circuitry is further configured to:
- automatically determine an appropriate position where the sponsored object should be overlaid on the image of the person, based at least in part on a size of a depicted portion of the person in the image and a type of sponsored object.

* * * * *